United States Patent
Tin et al.

(10) Patent No.: US 10,750,076 B2
(45) Date of Patent: Aug. 18, 2020

(54) NETWORK DEVICE, IMAGE PROCESSING METHOD, AND COMPUTER READABLE MEDIUM

(71) Applicant: Wistron Corporation, New Taipei (TW)

(72) Inventors: Hsiao-Wen Tin, New Taipei (TW); Tsung-Cheng Chiang, New Taipei (TW); Yen-Chuan Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/276,632

(22) Filed: Feb. 15, 2019

(65) Prior Publication Data
US 2020/0145573 A1      May 7, 2020

(30) Foreign Application Priority Data
Nov. 5, 2018   (TW) .............................. 107139140 A (51) Int. Cl.
*H04N 5/232*   (2006.01)
*G06K 9/00*   (2006.01)
*H04N 5/14*   (2006.01)

(52) U.S. Cl.
CPC ..... *H04N 5/23206* (2013.01); *G06K 9/00342* (2013.01); *G06K 9/00751* (2013.01); *H04N 5/144* (2013.01)

(58) Field of Classification Search
CPC .............. H04N 5/23206; H04N 5/144; G06K 9/00342; G06K 9/00751
See application file for complete search history.

(56) References Cited

U.S. PATENT DOCUMENTS

| 2010/0026802 A1* | 2/2010 | Titus ................ G08B 13/19608 348/143 |
| 2016/0005281 A1* | 1/2016 | Laska ...................... H04N 7/18 348/143 |
| 2020/0021649 A1* | 1/2020 | Natanzon ............ H04L 67/1095 |

FOREIGN PATENT DOCUMENTS

| TW | 201639359 | 11/2016 |
| TW | 201822160 | 6/2018 |

OTHER PUBLICATIONS

"Office Action of Taiwan Counterpart Application", dated Feb. 10, 2020, pp. 1-14.

* cited by examiner

*Primary Examiner* — Mekonnen D Dagnew
(74) *Attorney, Agent, or Firm* — JCIPRNET (57) ABSTRACT

The disclosure provides a network device, an image processing method, and a computer readable medium. The method includes: receiving a video stream from an IP camera; detecting whether a predetermined motion event occurs in the video stream according to a designated motion detection mode; in response to the predetermined motion event is detected, generating an event mark corresponding to the predetermined motion event and extracting a video clip corresponding to the predetermined motion event from the video stream; determining whether a video content satisfying a notification condition exists in the video clip; and in response to the video content satisfying the notification condition, sending the event mark and the video content to a smart device accessing the network device.

20 Claims, 6 Drawing Sheets

NETWORK DEVICE, IMAGE PROCESSING METHOD, AND COMPUTER READABLE MEDIUM

CROSS-REFERENCE TO RELATED APPLICATION

This application claims the priority benefit of Taiwan application serial no. 107139140, filed on Nov. 5, 2018. The entirety of the above-mentioned patent application is hereby incorporated by reference herein and made a part of this specification.

TECHNICAL FIELD

The disclosure relates to a network device, an image processing method, and a computer readable medium, and more particularly to a network device, an image processing method, and a computer readable computer capable of providing a smart detection function according to a video stream from traditional IP camera media.

BACKGROUND

An IP Camera contains components such as an image capture unit, an image compression module, and a microprocessor. Each IP camera has its own IP address, so the IP camera can be connected directly to the network as a network device, or indirectly connected to the network via a hub, bridge, and/or gateway. With the rapid development of Internet of Things (IoT), the IP camera is currently a product with great growth momentum.

In general, the IP camera can be used to record people and things within a range at a specific location as video streams. Afterwards, the IP camera can then instantly transmit the obtained video stream to a remote receiving end (such as a server) through the network for a relevant personnel to view. For example, consumers often use the IP camera as a baby monitor to watch a baby's moves.

However, for some traditional IP cameras merely having basic functions, the cameras may only have the function of recording and transmitting audio and video streams, so may not be able to handle various needs of modern users. Therefore, modern users may prefer to purchase a smart IP camera with the required intelligence functions, which may affect the marketing situation of traditional IP cameras. Moreover, for some users who have purchased a traditional IP camera, in addition to the additional cost of purchasing a smart IP camera, the traditional IP camera may be discarded because it has been out of demand, resulting in waste of resources.

SUMMARY

In view of this, the disclosure provides a network device, an image processing method, and a computer readable medium, which can be used to solve the above technical problems.

The disclosure provides an image processing method, adapted for a network device, including: receiving a first video stream from a first IP camera; detecting whether a first predetermined motion event occurs in the first video stream according to a designated motion detection mode; in response to detecting the first predetermined motion event, generating a first event mark corresponding to the first predetermined motion event, and extracting a first video clip corresponding to the first predetermined motion event from the first video stream; determining whether the first video content satisfying a notification condition exists in the first video clip; and in response to the first video content satisfying the notification condition, sending the first event mark and the first video content to a smart device accessing the network device.

The disclosure provides a network device including a storage circuit and a processor. The storage circuit stores multiple modules. The processor is coupled to the storage circuit and accesses the foregoing modules to perform the following steps: receiving a first video stream from a first IP camera; detecting whether a first predetermined motion event occurs in the first video stream according to a designated motion detection mode; in response to detecting the first predetermined motion event, generating a first event mark corresponding to the first predetermined motion event, and extracting a first video clip corresponding to the first predetermined motion event from the first video stream; determining whether the first video content satisfying a notification condition exists in the first video clip; and in response to the first video content satisfying the notification condition, sending the first event mark and the first video content to a smart device accessing the network device.

The disclosure provides an image processing method, adapted for a network device, including: receiving a first video stream from a first IP camera; detecting whether a first predetermined motion event occurs in the first video stream according to a designated motion detection mode; in response to detecting the first predetermined motion event, generating a first event mark corresponding to the first predetermined motion event, and extracting a first video clip corresponding to the first predetermined motion event from the first video stream; and sending the first event mark and first video clip to a cloud server.

The disclosure provides a computer readable medium for storing a program. When the computer loads and executes the program, the following steps are performed: receiving a first video stream from a first IP camera; detecting whether a first predetermined motion event occurs in the first video stream according to a designated motion detection mode; in response to detecting the first predetermined motion event, generating a first event mark corresponding to the first predetermined motion event, and extracting a first video clip corresponding to the first predetermined motion event from the first video stream; determining whether the first video content satisfying a notification condition exists in the first video clip; and in response to satisfying the notification condition, the first event mark and the first video content are sent to a smart device accessing the network device.

Based on the above, the network device, the image processing method, and the computer readable medium provided by the disclosure allow the network device to perform detection according to the designated motion detection mode after receiving the video stream from the IP camera, and correspondingly perform a relevant intelligent identification after detecting an occurrence of the predetermined motion event.

In order to make the aforementioned features and advantages of the disclosure more apparent and comprehensible, embodiments accompanying figures are described in detail below.

DETAILED DESCRIPTION

Briefly, the disclosure provides a network device, an image processing method, and a computer readable medium, which can perform detection function specified by a user through a smart device (such as a mobile phone) after receiving a video stream from a traditional IP camera. In this way, the user can use the above network device with a traditional IP camera to realize the smart functions as a smart IP camera can provide, so that it is not necessary to purchase a smart IP camera and/or abandon the traditional IP camera. The details will be described below.

Figure 1:
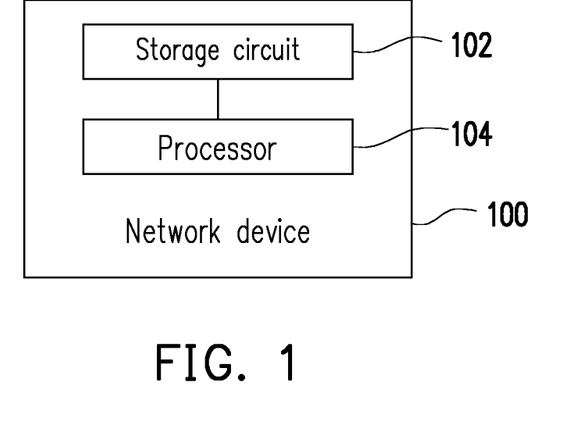
FIG. 1 is a schematic diagram illustrating a network device according to an embodiment of the disclosure.

Please refer to FIG. 1, which is a schematic diagram of a network device according to an embodiment of the disclosure. In the embodiment, the network device 100 may be a bridge, gateway, server, or a combination thereof that is connected to an IP camera. The above IP camera can be a traditional IP camera that only records and transmits video streams. Alternatively, the above IP camera may also be a smart IP camera, which has other additional management functions in addition to the function of recording and transmitting the video streams.

As shown in FIG. 1, the network device 100 includes a storage circuit 102 and a processor 104. The storage circuit 102 is, for example, any type of fixed or removable random access memory (RAM), read-only memory (ROM), flash memory, hard disc or other similar device or combination of these devices, which can be used to record multiple codes or modules.

The processor 104 is coupled to the storage circuit 102 and can be a general purpose processor, a special purpose processor, a traditional processor, a digital signal processor, a plurality of microprocessors, one or more microprocessors combined with a digital signal processor core, a controller, a microcontroller, Application Specific Integrated Circuit (ASIC), Field Programmable Gate Array (FPGA), any other kind of integrated circuit, state machine, Advanced RISC Machine (ARM) based processor and the like.

In an embodiment of the disclosure, the processor 104 may load the codes or modules recorded in the storage circuit 102 to perform the image processing method proposed by the disclosure, as further described below.

Figure 2:
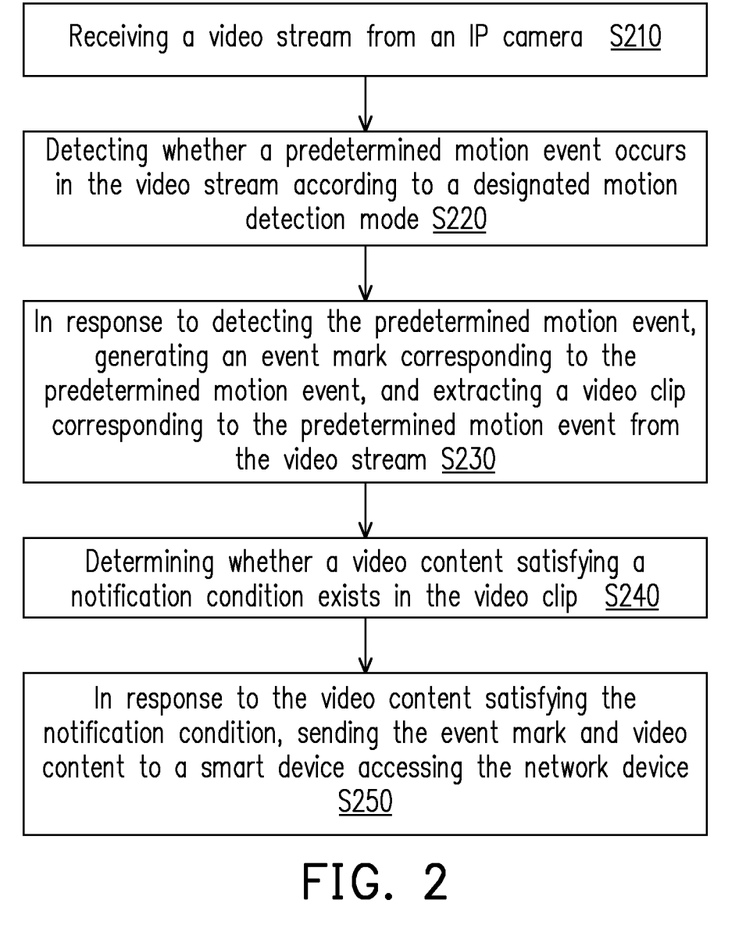
FIG. 2 is a flowchart illustrating an image processing method according to an embodiment of the disclosure.
Figure 3:
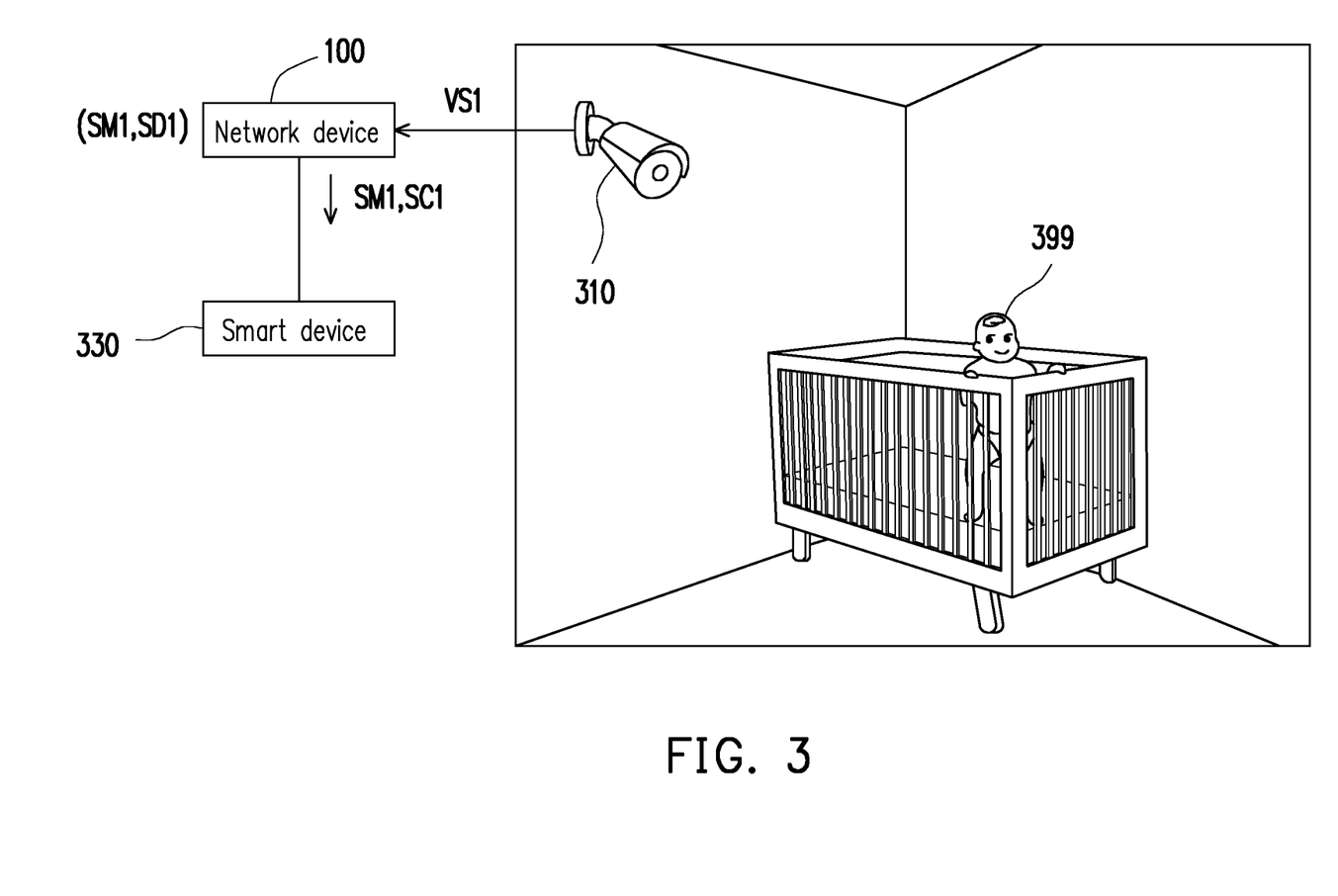
FIG. 3 is an application scenario diagram according to an embodiment of the disclosure.

Referring to FIG. 2 and FIG. 3, FIG. 2 is a flowchart of an image processing method according to an embodiment of the disclosure, and FIG. 3 is an application scenario diagram according to an embodiment of the disclosure. In the embodiment, the method of FIG. 2 can be performed by the network device 100 of FIG. 1, and the details of the steps of FIG. 2 will be described below with reference to the elements of FIG. 1 and the scenario of FIG. 3.

First, in step S210, the processor 104 may receive a video stream VS1 from an IP camera 310. In the embodiment, it is assumed that the IP camera 310 is a traditional IP camera, which has only the function of recording and transmitting the video stream VS1, but the disclosure is not limited thereto.

In step S220, the processor 104 may detect whether a predetermined motion event occurs in the video stream VS1 according to a designated motion detection mode. In different embodiments, the designated motion detection mode may include at least one of a face detection mode, an animal detection mode, a motion detection mode, and a text detection mode. Moreover, the motion detection mode can be set by the user through a smart device connected to the network device 100. In an embodiment, the smart device can be installed with an application for accessing the network device 100, and the user can set the designated motion detection mode to the face detection mode, the animal detection mode, the motion detection mode, and/or the text detection mode by operating the application, but the disclosure is not limited thereto.

For convenience of explanation, it will be assumed below that the designated motion detection mode selected by the user is the face detection mode, but it is not intended to limit the possible embodiments of the disclosure. Under the assumption, the predetermined motion event may be "face detected", and the designated motion detection mode is set to face detection mode correspondingly.

In the scenario of FIG. 3, assuming that a face of a baby 399 is turned to the IP camera 310, the IP camera 310 can transmit the video stream VS1 (which includes a plurality of consecutive frames) of the face of the baby 399 to the network device 100. In this case, the processor 104 can perform motion detection by, for example, the difference between the above frames, and detect the face in the video stream VS1 according to the designated motion detection mode. Accordingly, the processor 104 may determine that the predetermined motion event (i.e., "face detected") described above has occurred in the video stream VS1.

In another embodiment, the processor 104 may invoke a first application programming interface (API) to detect whether a predetermined motion event occurs in the video stream VS1 according to the designated motion detection mode. The first API described above is, for example, a face detection API, which can be used to determine whether a face appears in each frame of the video stream VS1.

In other embodiments, if the network device 100 does not have the ability to detect whether a predetermined motion event occurs in the video stream VS1 according to the designated motion detection mode, the processor 104 may forward the video stream VS1 to a cloud server (not shown), such that the cloud server may detect whether the predetermined motion event occurs in the video stream VS1 according to the designated motion detection mode. The cloud server described above is, for example, a server that manages the network device 100. In short, if the network device 100 cannot perform operations such as face recognition according to the requirements of the user, the network device 100 may forward the video stream VS1 to the cloud server and request the cloud server described above to assist operations such as face recognition, but the disclosure is not limited thereto.

Then, in step S230, in response to detecting the predetermined motion event, the processor 104 may generate an event mark SM1 corresponding to the predetermined motion event, and extract a video clip SD1 corresponding to the predetermined motion event from the video stream VS1. In various embodiments, since the predetermined motion event may be continuously occurring for a period of time, the processor 104 may fetch the video clip corresponding to the time period in the video stream VS1 as the video clip SD1.

For example, suppose a baby 399 turns the face to the IP camera 310 due to changing posture during sleep, and turns the face to the other side after maintaining the posture for 30 minutes, so that the IP camera 310 can no longer capture the face. In this case, the video clip SD1 extracted out from the video stream VS1 by the processor 104 may include a 30-minute clip from the time the face of the baby 399 is captured until the baby 399 turns his face to the other side, but the disclosure is not limited to this.

In addition, the event mark SM1 may include at least one of an identity of the IP camera 310, a mark text of the predetermined motion event, time information of the predetermined motion event, and a length of the video clip SD1 (for example, 30 minutes). In various embodiments, the identity of the IP camera 310 may be a number or a designated name that the user has previously set to the IP camera 310 in the application. The mark text of the predetermined motion event may be used to specifically describe the predetermined motion event, for example, including the words "face detected", but is not limited thereto. The time information of the predetermined motion event is, for example, the date and time at which the predetermined motion event occurs, for example, the date and time when the face of the baby 399 is detected.

Then, in step S240, the processor 104 may determine whether a video content SC1 satisfying a notification condition exists in the video clip SD1. In the embodiment, the processor 104 may input the video clip SD1 to an artificial intelligence module to identify whether there is a video content SC1 satisfying the notification condition in the video clip SD1, and the artificial intelligence module may have different recognition functions according to the requirements of the designer. In an embodiment, the artificial intelligence module may be implemented by a specific API having a recognition function, or may be composed of a service thread that can cooperatively provide a recognition function, but is not limited thereto.

Moreover, when the processor 104 finds through the artificial intelligence module that a clip including a target to be recognized exists in the video clip SD1, it can be determined that the video content SC1 satisfying the notification condition exists in the video clip SD1. On the other hand, if the processor 104 fails to identify the target to be recognized in the video clip SD1, it can be determined that the video content satisfying the notification condition does not exist in the video clip SD1.

For example, if the artificial intelligence module can be used to identify whether human eyes are opened, the processor 104 can identify whether a face in each frame of the video clip SD1 has opened the eyes (i.e., wake up) after the processor 104 inputs the video clip SD1 to the artificial intelligence module. For example, the processor 104 may determine whether the eyes of the baby 399 are opened in the video clip SD1.

In an embodiment, if the processor 104 detects that the eyes are opened in the video clip SD1, the processor 104 may determine that there is a video content SC1 satisfying the notification condition in the video clip SD1 (for example, video clip of the baby 399 with opened the eyes). On the other hand, if the processor 104 does not detect an opening of the eyes in the video clip SD1, the processor 104 may determine that there is no video content satisfying the notification condition in the video clip SD1.

In another embodiment, the artificial intelligence module may also be used to identify whether the baby 399 is actually sleeping or just closing the eyes. For example, the artificial intelligence module can analyze the face and eye state of the baby 399 and convert the measured state into a corresponding sleep stage (e.g., shallow sleep, deep sleep, or rapid eye movement (REM), etc.). In this case, if the eyes of the baby 399 are only half-closed, the processor 104 may also determine that the video content satisfying the notification condition does not exist in the video clip SD1. In another embodiment, the artificial intelligence module may also determine whether the video content SC1 satisfying the notification condition exists according to a combination or statistics of a plurality of video clips SD1.

Thereafter, in step S250, in response to the video content SC1 satisfying the notification condition, the processor 104 may send the event mark SM1 and the video content SC1 to a smart device 330 accessing the network device 100. In one embodiment, if the processor 104 detects that the baby 399 has opened the eyes, the processor 104 may correspondingly send the event mark SM1 and the video content SC1 (e.g., the video clip about the baby 399 with opened eyes) to the smart device 330. The smart device 330 is, for example, a smart phone held by a family of the baby 399, which can be installed with the previously mentioned application for accessing the network device 100. In this case, the family of the baby 399 can view, for example, the video clip that the baby 399 wakes up and the corresponding time information and the like in the above application, but the disclosure is not limited thereto.

In another embodiment, the processor 104 may ignore the event mark SM1 and the video clip SD1 in response to the video content not satisfying the notification condition. That is, if the video clip SD1 merely contains clips of the baby 399 with closed eyes, the processor 104 may ignore the event mark SM1 and the video clip SD1 accordingly. In other words, the processor 104 will not send the clips of the baby 399 with closed eye to the smart device 330, but the disclosure is not limited thereto.

In addition, in other embodiments, network device 100 may encrypt event mark SM1 and video content SC1 into an event report and send an event report to the cloud server. Afterwards, the cloud server may generate a block according to the event report after verifying the event report, and add the block to a blockchain.

Specifically, the processor 104 may retrieve the date and time from the system to generate a time stamp, and generate an event header of the video content SC1 according to the designated motion detection mode and a public key.

Afterwards, the processor 104 can use a SHA256 method to generate a hash code as the check code of the video content SC1, and add the foregoing event header to the foregoing check code, and then encrypt it by using a private key to generate a digital signature. Then, the processor 104 may transmit the generated digital signature and the video content SC1 to the cloud server.

The cloud server may confirm the integrity of the event header and the video content SC1. If confirmed, the cloud server may generate a block accordingly and add the block to the existing blockchain.

For example, a cloud sound server may retrieve a public key corresponding to the network device 100 from a database according to the identity of the network device 100. After confirming that the public key obtained from the database matches the public key in the event header and verifying the hash code is correct, the cloud server may prepare to make the corresponding block.

In an embodiment, the difficulty of the cloud server performing mining may be set by designer according to requirement. Thereafter, the cloud server may generate a block header, which may include a timestamp, version, block number, difficulty, nonce, hash code, previous hash code, and the like. After that, the cloud server may add the block header to the storage position of the video content SC1 to generate the corresponding block, and put the block into the blockchain.

In short, the video content SC1 may be recorded on the cloud server as a block, so as to avoid being modified by others, thereby achieving the effect of maintaining data security. And, subsequent blockchain tracking technology can also be used to view the video content SC1 based on related information (for example, event mark, time stamp, block number, designated motion detection mode, public key, etc.).

As can be seen from the above, the method provided by the disclosure allows the network device to perform detection according to the designated motion detection mode after receiving the video stream from the traditional IP camera, and correspondingly performing the relevant smart identification after detecting the occurrence of the predetermined motion event. In this way, users may achieve the same smart functions without purchasing a smart IP camera. Moreover, since a related configuration of the designated motion detection mode and the smart identification can be set by the user through the corresponding application, the user can be provided with higher operational freedom. The following is further described in conjunction with FIG. 4.

Figure 4:
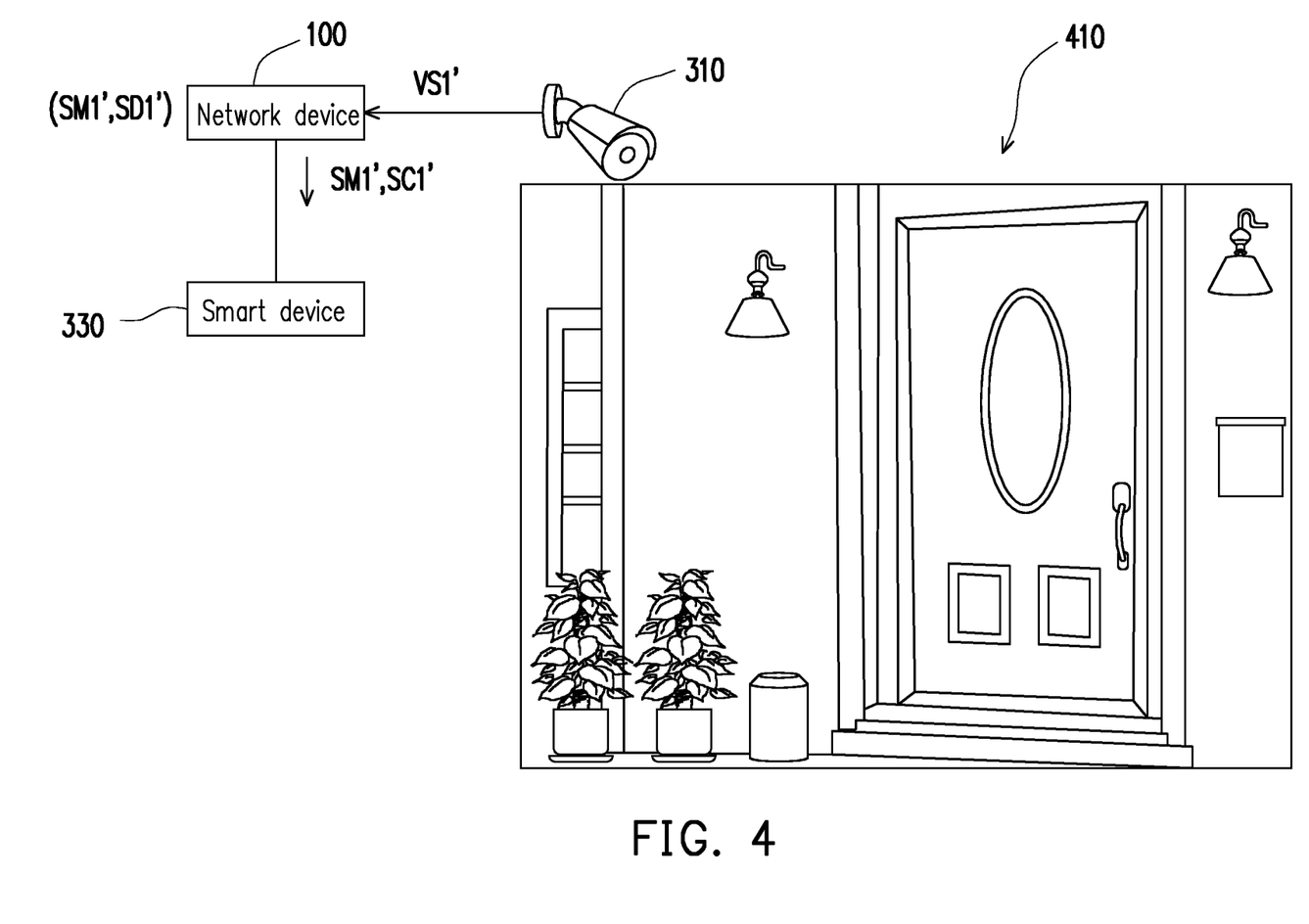
FIG. 4 is another application scenario diagram according to FIG. 3.

Please refer to FIG. 4, which is another application scenario diagram according to FIG. 3. As shown in FIG. 4, it is assumed that the IP camera 310 originally used to monitor the baby 399 in FIG. 3 is moved to the doorway 410 to determine whether a suspicious person passes through the door 410.

In the embodiment, since the above detection still involves face detection, the user can maintain the designated motion detection mode in the face detection mode by the application on the smart application 330. However, since the situation in FIG. 4 is used to identify suspicious persons, the user can change the artificial intelligence module used in the above application to a module that can be used to identify whether the captured face is a legitimate person. Moreover, the user may first input facial information (such as a family's face photo) of a legal person (such as a family member) into the above artificial intelligence module to let the module learn the characteristics of the family's face as a basis for subsequent judgment.

Thereafter, when the network device 100 receives a video stream VS1' from the IP camera 310, the processor 104 may determine whether there is a frame including the face among the respective frames of the video stream VS1'. If yes (i.e., a predetermined motion event occurs), the processor 104 may generate an event mark SM1' accordingly, and extract a video clip SD1' corresponding to the predetermined motion event from the video stream VS1'. In the embodiment, if the processor 104 determines that a predetermined motion event occurs, it represents that there is a video clip in which the face is captured in the video stream VS1'. Based on this, the processor 104 can extract the video clip as the video clip SD1' and generate the corresponding event mark SM1'.

Thereafter, the processor 104 may identify whether a video content SC1' satisfying the notification condition exists in the video clip SD1'. In the embodiment, the processor 104 may input the video clip SD1' to the artificial intelligence module capable of recognizing the suspicious person to identify whether the video content SC1' satisfying the notification condition exists in the video clip SD1'. If the processor 104 detects a face that does not belong to the family member in the video clip SD1' (for example, a face of a suspicious person), the processor 104 may determine that a video content SC1 satisfying the notification condition exists in the video clip SD1' (for example, a video clip of a suspicious person is detected). On the other hand, if the processor 104 does not detect a face that does not belong to the family member in the video clip SD1', the processor 104 may determine that the video content satisfying the notification condition does not exist in the video clip SD1'.

Thereafter, in response to the video content SC1' satisfying the notification condition, the processor 104 may transmit the event mark SM1' and the video content SC1' to the smart device 330 accessing the network device 100. In an embodiment, if the processor 104 detects a suspicious person, the processor 104 may correspondingly send the event mark SM1' and the video content SC1' (e.g., a video clip detecting the face of the suspicious person) to the smart device 330. In this case, for example, a homeowner may view the video clip of the suspicious person and the corresponding time information, etc., in the above application, but the disclosure is not limited thereto.

As can be seen from the above, the user only needs to adjust the relevant settings in the application according to the requirements, so that the network device 100 and the IP camera 310 can cooperate to provide the required smart functions, thereby obtaining a more flexible and smart operating experience.

In addition, in other embodiments, the method of the disclosure can also splice the video content captured by multiple IP cameras into a longer video content according to the time information in the event mark, so that the user may continuously view the video content captured by different IP cameras. This will be further explained below with reference to FIG. 5.

Figure 5:
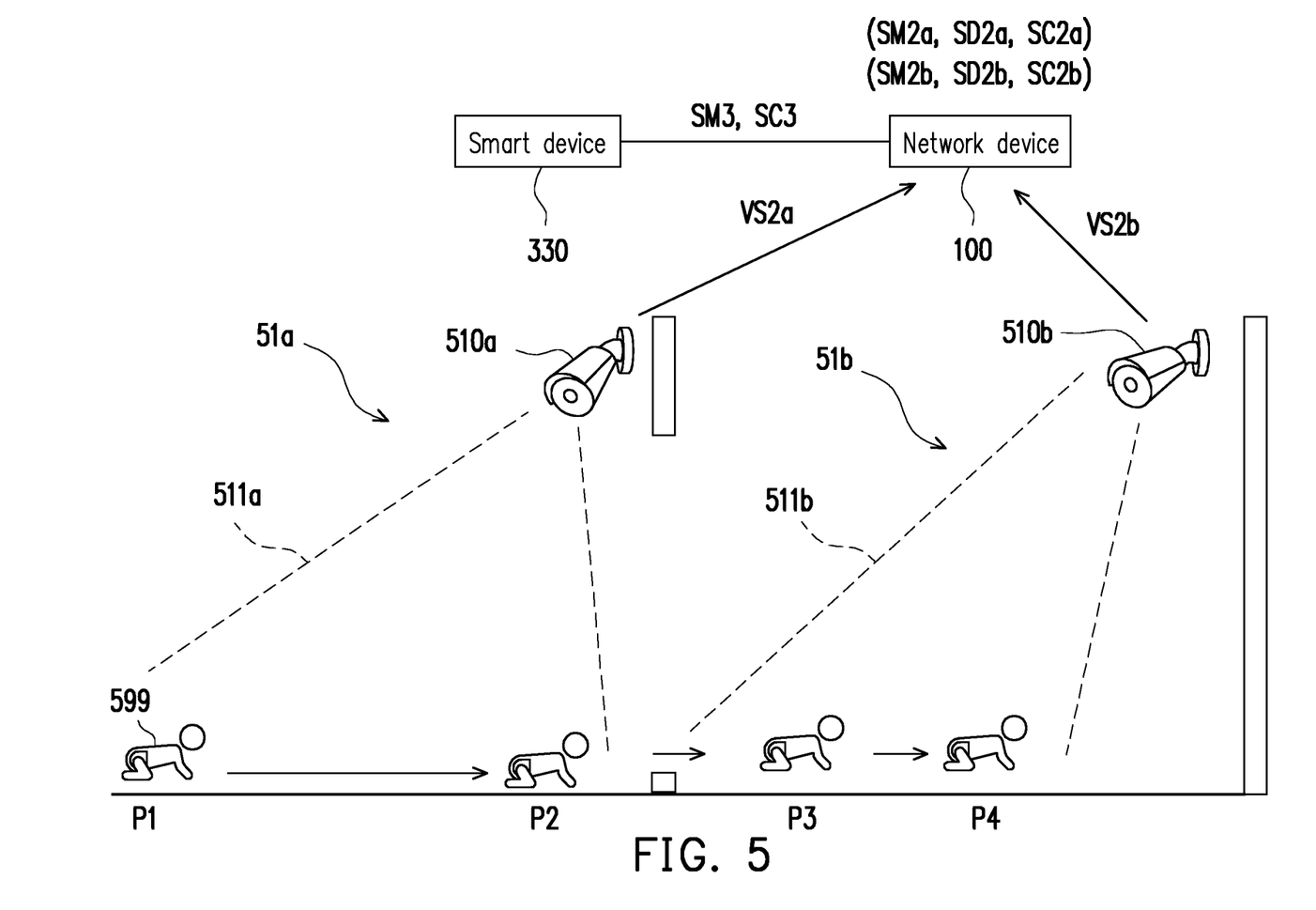
FIG. 5 is a schematic diagram illustrating monitoring of a baby according to an embodiment of the disclosure.

Please refer to FIG. 5, which is a schematic diagram illustrating monitoring of a baby according to an embodiment of the disclosure. As shown in FIG. 5, IP cameras 510a and 510b may be disposed in rooms 51a and 51b, respectively, for monitoring the behavior of a baby 599 in the rooms 51a and 51b. In this embodiment, the IP cameras 510a and 510b may have monitoring ranges 511a and 511b, respectively, and the manner in which each IP camera interacts with the network device 100 may refer to the interaction manner between the IP camera 310 and the network device 100 in the previous embodiment, which would not be repeated hereinafter.

In the embodiment, it is assumed that the baby 599 wakes up at position P1 at a first time point and moves from position P1 to position P2 in a first time interval. Correspondingly, the network device 100 may determine that a predetermined motion event (hereinafter referred to as a first predetermined motion event) is generated according to a video stream VS2a from an IP camera 510a, and correspondingly generate an event mark SM2a, a video clip SD2a, and a video content SC2a. The video clip SD2a may be a video clip in which the baby 599 face (either blinking/closed eyes) is captured in the room 51a. The video content SC2a can be a video clip of the baby 599 awake from position P1 to position P2, and a length of the video clip may equal to the above first time interval.

Next, it is assumed that the baby 599 then moves from position P2 to position P3, and moves from position P3 to position P4 between a second time intervals. Correspondingly, the network device 100 may determine that a predetermined motion event (hereinafter referred to as a second predetermined motion event) has occurred according to the video stream VS2b from the IP camera 510b, and correspondingly generate an event mark SM2b, a video clip SD2b, and a video content SC2b. The video clip SD2b may be a video clip of the baby 599 moving in the room 51b. The video content SC2b can be a video clip of the baby 599 awake moving from position P3 to position P4, and the length of the video clip may equal to the second time interval described above.

Since the video clips SD2a and SD2b are clips where the baby 599 is awake, the processor 104 may determine that the video clips SD2a and SD2b both satisfy the notification condition. Then, the processor 104 may determine whether the second predetermined motion event occurs in succession of the first predetermined motion event according to time information of the first predetermined motion event (which is recorded in the event mark SM2a) and time information of the second predetermined motion event (which is recorded in the event mark SM2b).

In FIG. 5, since the baby 599 is moved from position P1 to position P4, the processor 104 may determine that the second predetermined motion event is subsequent to the first predetermined motion event according to the time information. Based on this, the processor 104 may splice the video content SC2b to the video content SC2a to generate video content SC3, and correspondingly generate an event mark SM3 associated with the video content SC3. Thereafter, the processor 104 may transmit the video content SC3 and the event mark SM3 to the smart device 330.

In the embodiment of FIG. 5, the video content SC3 generated by the processor 104 is, for example, a continuous video clip of the baby 599 moving from position P1 to position P4, and the event mark SM3 may include information such as the length of the video content SC3, the time information, and the identity of IP cameras 510a and 510b for users of smart device 330 to refer to through the application.

Figure 6:
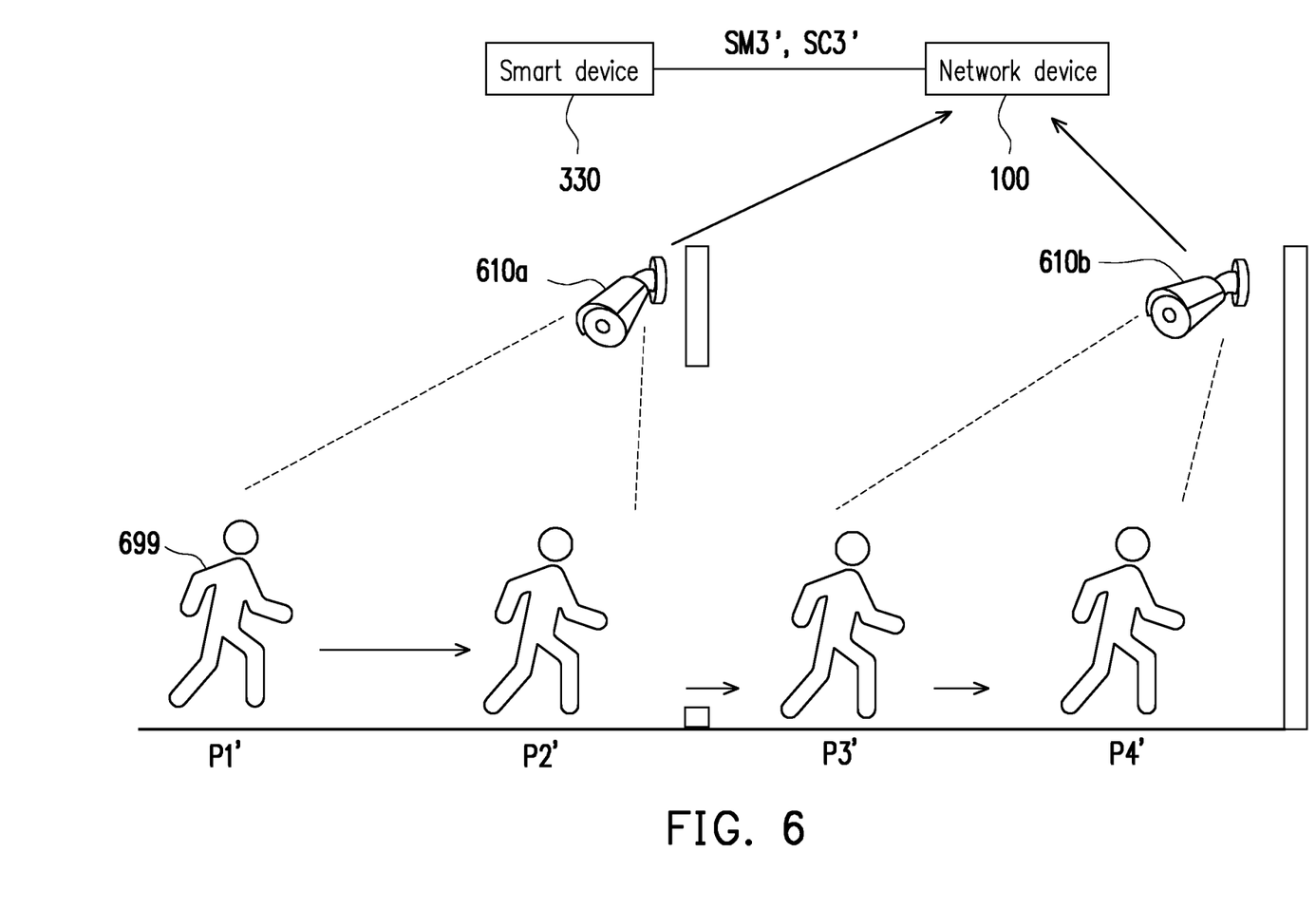
FIG. 6 is a schematic diagram illustrating monitoring of a suspicious person according to FIG. 5.

Please refer to FIG. 6, which is a schematic diagram illustrating monitoring of a suspicious person according to FIG. 5. In this embodiment, the operation of the network device 100, the IP cameras 610a and 610b is substantially similar to the operation of the network device 100, the IP cameras 510a and 510b in FIG. 5, and details thereof will not be described herein.

In this embodiment, the network device 100 of FIG. 6 generates a video content SC3' and an event mark SM3'. The video content SC3' is, for example, a continuous video clip of a suspicious person 699 moving from position P1' to position P4', and the event mark SM3' may include information such as the length of the video content SC3', the time information, the identity of the IP cameras 610a and 610b for users of the smart device 330 to refer to through the app.

It can be seen from the above that the method proposed by the disclosure can intelligently combine the video contents corresponding to the multiple IP cameras into a complete video clip according to the time information for user's reference. In addition, the video contents that together form the complete video clip are not limited to be corresponding to the same designated motion detection mode or predetermined motion event. That is, the method of the disclosure may also combine a plurality of consecutive predetermined motion events corresponding to different designated motion detection modes (such as a face detection mode and a motion detection mode) into a complete video clip. In another embodiment, the user may specify the motion detection mode as a combination of the face detection and the motion detection through the application setting, but the disclosure is not limited thereto.

Moreover, the processor 104 may also set different priority orders for the different designated motion detection modes. For example, the priority of the face detection mode may be set to be higher than the motion detection mode. Based on this, the processor 104 may continue to detect the predetermined motion event corresponding to the motion detection mode after first detecting the predetermined motion event corresponding to the face detection mode. Taking FIG. 5 as an example, assuming that the baby 599 has woken up is captured by the IP camera 510a at the location P1, the processor 104 may continue to capture a process of the baby 599 crawling from the location P1 to the location P2 based on the motion detection mode.

In addition, although the above embodiment only teaches that the method of FIG. 2 is separately performed by the network device 100 to implement the foregoing smart functions, but in other embodiments, the method of FIG. 2 may also be collaboratively executed by a network device and a cloud server to implement the foregoing smart functions.

Figure 7:
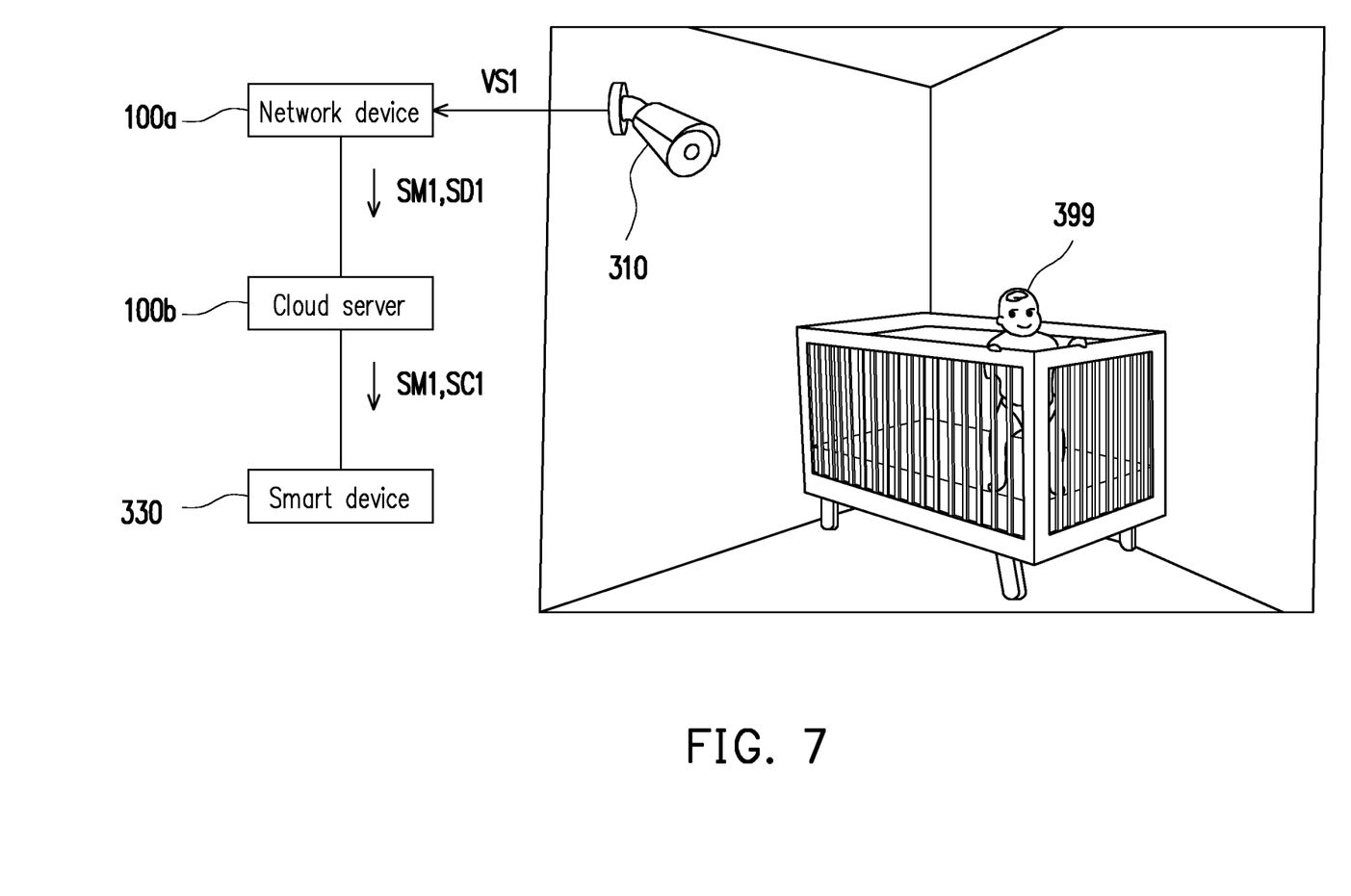
FIG. 7 is another application scenario diagram according to FIG. 3.

Please refer to FIG. 7, which is another application scenario diagram according to FIG. 3. As shown in FIG. 7, in this embodiment, a network device 100a (for example, a bridge or gateway connected to the IP camera 310) may receive the video stream VS1 from the IP camera 310, and detect whether the predetermined motion event occurs in the video stream VS1 according to the designated motion detection mode. In response to detecting the predetermined motion event, the network device 100a may generate the event mark SM1 corresponding to the predetermined motion event, and extract the video clip SD1 corresponding to the predetermined motion event from the video stream VS1. Thereafter, the network device 100a may send the event mark SM1 and the video clip SD1 to a cloud server 100b for further smart identification by the cloud server 100b.

Accordingly, the cloud server 100b may determine whether the video content SC1 satisfying the notification condition exists in the video clip SD1. And, in response to the video content SC1 satisfying the notification condition, the cloud server 100b may transmit the event mark SM1 and the video content SC1 to the smart device 330 accessing the network device 100a.

In short, the network device 100a can be configured to perform steps S210-S230 of FIG. 2, while the cloud server 100b can be configured to perform steps S240-S250 of FIG. 2, and the details of steps S210-S250 can be referenced to previous implementations, which will not be repeated hereinafter.

From another point of view, the network device 100 of FIG. 3 can also be considered as a combination of the network device 100a and the cloud server 100b of FIG. 7, but the disclosure is not limited thereto. In other embodiments, steps S240~S250 can also be implemented by other APIs.

In addition, although the above embodiment uses a traditional IP camera as an example, the network device proposed by the disclosure can also be used with a smart IP camera. Taking FIG. 3 as an example, it is assumed that the IP camera 310 is a smart IP camera and has several management functions (such as simple motion detection) configured by manufacturers. In this case, since the IP camera 310 may send pre-processed data related to the foregoing management function to the network device 100, the network device 100 may call a second API to forward the pre-processed data of the IP camera 310 to a server after receiving the pre-processed data, or the second API may determine whether the video content satisfying the notification condition exists in the pre-processed data. In this way, the IP camera 310 can still provide the smart functions configured by the relevant manufacturers. The above server may be maintained by the manufacturers of the IP camera 310, but is not limited thereto.

The disclosure further provides a computer readable medium that performs the above image processing method. The computer readable medium consists of a plurality of program instructions (such as configuring program instructions and deploying program instructions) embedded therein. The program instructions can be loaded into an electronic device and perform the same image processing method as described above and the functions of the network device.

In summary, the network device, the image processing method, and the computer readable medium provided by the disclosure allow the network device to perform detection according to the designated motion detection mode after receiving the video stream from the IP camera, and correspondingly perform the relevant smart identification after detecting the occurrence of the predetermined motion event. In this way, users can achieve the same smart functions without purchasing a smart IP camera. Moreover, since the related configuration of the designated motion detection mode and the smart identification can be configured by the user through the corresponding application, the user can be provided with more operational freedom.

In addition, the disclosure can also automatically combine continuous video content captured by multiple IP cameras into a complete video content, thereby providing a more convenient operation experience for the users.

Although the disclosure has been disclosed in the above embodiments, it is not intended to limit the disclosure, and those skilled in the art can make some modifications and refinements without departing from the spirit and scope of the disclosure. The scope of the disclosure is defined by the scope of the appended claims.

What is claimed is:

1. An image processing method, adapted for a network device, comprising:
   receiving a first video stream from a first Internet protocol (IP) camera;
   detecting whether a first predetermined motion event occurs in the first video stream according to a designated motion detection mode;
   in response to detecting the first predetermined motion event, generating a first event mark corresponding to the first predetermined motion event, and extracting a first video clip corresponding to the first predetermined motion event from the first video stream;
   determining whether a first video content satisfying a notification condition exists in the first video clip; and
   in response to the first video content satisfying the notification condition, sending the first event mark and the first video content to a smart device accessing the network device.

2. The image processing method according to claim 1, wherein the first event mark comprises at least one of an identity of the first IP camera, a mark text of the first predetermined motion event, time information of the first predetermined motion event, and a length of the first video clip.

3. The image processing method according to claim 1, wherein the designated motion detection mode comprising at least one of a face detection mode, an animal detection mode, a motion detection mode, and a text detection mode.

4. The image processing method according to claim 1, wherein the step of detecting whether the first predetermined motion event occurs in the first video stream according to the designated motion detection mode comprises: invoking a first application interface according to the designated motion detection mode to detect whether the first predetermined motion event occurs in the first video stream, and the method further comprising:
   receiving pre-processed data from the first IP camera; and
   invoking a second application interface to forward the pre-processed data of the first IP camera to a server or determining whether the first video content satisfying the notification condition exists in the pre-processed data.

5. The image processing method according to claim 1, wherein the network device comprises a bridge, a gateway, a cloud server or a combination thereof connected to the first IP camera.

6. The image processing method according to claim 1, wherein the first event mark comprises time information of the first predetermined motion event, and the method further comprises:
   receiving a second video stream from a second IP camera;
   detecting whether a second predetermined motion event occurs in the second video stream according to the designated motion detection mode;
   in response to detecting the second predetermined motion event, generating a second event mark corresponding to the second predetermined motion event, and extracting a second video clip from the second video stream corresponding to the second predetermined motion event, the second event mark comprises time infonnation of the second predetermined motion event;
   determining whether a second video content satisfying the notification condition exists in the second video clip;
   in response to the second video content satisfying the notification condition, determining whether the second predetermined motion event occurs in succession of the first predetermined motion event according to the time information of the second predetermined motion event;
   in response to determining that the second predetermined motion event occurs in succession of the first predetermined motion event, splicing the second video content to the first video content to generate a third video content, and correspondingly generating a third event mark associated with the third video content; and
   sending the third video content and the third event mark to the smart device.

7. The image processing method according to claim 1, wherein in response to the network device does not have the ability to detect whether the first predetermined motion event occurs in the first video stream according to the designated motion detection mode, the method further comprises:
   transmitting the first video stream to a cloud server, so that the cloud server detects whether the first predetermined motion event occurs in the first video stream according to the designated motion detection mode;
   in response to the cloud server detecting that the first predetennined motion event occurs, generating the first event mark corresponding to the first predetermined motion event, and extracting the first video clip corresponding to the first predetennined motion event from the first video stream.

8. The image processing method according to claim 1, further comprising:
encrypting the first event mark and the first video content into a first event report, and sending the first event report to a cloud server, so that the cloud server generates a block according to the first event report and adds the block to a blockchain after validating the first event report.

9. The image processing method according to claim 1, further comprising ignoring the first event mark and the first video clip in response to the first video content not satisfying the notification condition.

10. A network device, comprising:
a storage circuit, configured for storing a plurality of modules; and
a processor, coupled to the storage circuit, accesses the plurality of modules to perform the following steps:
receiving a first video stream from a first Internet protocol (IP) camera;
detecting whether a first predetermined motion event occurs in the first video stream according to a designated motion detection mode;
in response to detecting the first predetermined motion event, generating a first event mark corresponding to the first predetermined motion event, and extracting a first video clip corresponding to the first predetermined motion event from the first video stream;
determining whether a video content satisfying a notification condition exists in the first video clip; and
in response to the first video content satisfying the notification condition, send the first event mark and the video content to a smart device accessing the network device.

11. The network device according to claim 10, wherein the first event mark comprises at least one of an identity of the first IP camera, a mark text of the first predetermined motion event, time information of the first predetermined motion event, and a length of the first video clip.

12. The network device according to claim 10, wherein the designated motion detection mode comprises at least one of a face detection mode, an animal detection mode, a motion detection mode, and a text detection mode.

13. The network device according to claim 10, wherein the processor invokes a first application interface according to the designated motion detection mode to detect whether the first predetermined motion event occurs in the first video stream, and the processor is further configured to:
receive pre-processed data from the first IP camera; and
invoke a second application interface to forward the pre-processed data of the first IP camera to a server or determine whether the first video content satisfying the notification condition exists in the pre-processed data.

14. The network device according to claim 10, wherein the network device comprises a bridge, a gateway, a cloud server or a combination thereof connected to the first IP camera.

15. The network device according to claim 10, wherein the first event mark comprises time information of the first predetermined motion event, and the processor is further configured to:
receive a second video stream from a second IP camera;
detect whether a second predetermined motion event occurs in the second video stream according to the designated motion detection mode;
in response to the second predetermined motion event is detected, generate a second event mark corresponding to the second predetermined motion event, and extract a second video clip from the second video stream corresponding to the second predetermined motion event, the second event mark comprises time information of the second predetermined motion event;
determine whether a second video content satisfying the notification condition exists in the second video clip; and
in response to the second video content satisfying the notification condition, determine whether the second predetermined motion event occurs in succession of the first predetermined motion event according to the time information of the second predetermined motion event;
in response to determining that the second predeteHnined motion event occurs in succession of the first predetermined motion event, splice the second video content to the first video content to generate a third video content, and correspondingly generating a third event mark associated with the third video content; and
send the third video content and the third event mark to the smart device.

16. The network device according to claim 10, wherein in response to the network device not having the ability to detect whether the first predetermined motion event occurs in the first video stream according to the designated motion detection mode, the processor is further configured to:
transmit the first video stream to a cloud server, so that the cloud server detects whether the first predetermined motion event occurs in the first video stream according to the designated motion detection mode;
in response to the cloud server detecting that the first predetermined motion event occurs, generate the first event mark corresponding to the first predetermined motion event, and extract the first video clip from the first video stream corresponding to the first predetermined motion event.

17. The network device according to claim 10, wherein the processor is further configured to:
encrypt the first event mark and the first video content into a first event report, and send the first event report to a cloud server, so that the cloud server generates a block according to the first event report after validating the first event report, and adds the block to a blockchain.

18. The network device according to claim 10, wherein the processor is configured to ignore the first event mark and the first video clip in response to the first video content not satisfying the notification condition.

19. An image processing method, adapted for a network device, comprising:
receiving a first video stream from a first IP camera;
detecting whether a first predetermined motion event occurs in the first video stream according to a designated motion detection mode;
in response to detecting the first predetermined motion event, generating a first event mark corresponding to the first predetermined motion event, and extracting a first video clip corresponding to the first predetermined motion event from the first video stream; and
sending the first event mark and the first video clip to a cloud server.

20. A non-transitory computer readable medium having a built-in program, when a computer loads the program and executes, completes the following steps:
receiving a first video stream from a first IP camera;
detecting whether a first predetermined motion event occurs in the first video stream according to a designated motion detection mode;

in response to the first predetermined motion event is detected, generating a first event mark corresponding to the first predetermined motion event, and extracting a first video clip corresponding to the first predetermined motion event from the first video stream;

determining whether a first video content satisfies a notification condition exists in the first video clip; and in response to the first video content satisfies the notification condition, sending the first event mark and the first video content to a smart device accessing the network device.

* * * * *